INVENTOR:
ALBERT STRAUB

BY Michael S. Striker his ATTORNEY

March 24, 1970  A. STRAUB  3,501,974
APPARATUS FOR TRANSPORTING CINEMATOGRAPHIC FILM
Filed May 9, 1968  4 Sheets-Sheet 3

INVENTOR:
ALBERT STRAUB

BY Michael S. Striker his ATTORNEY

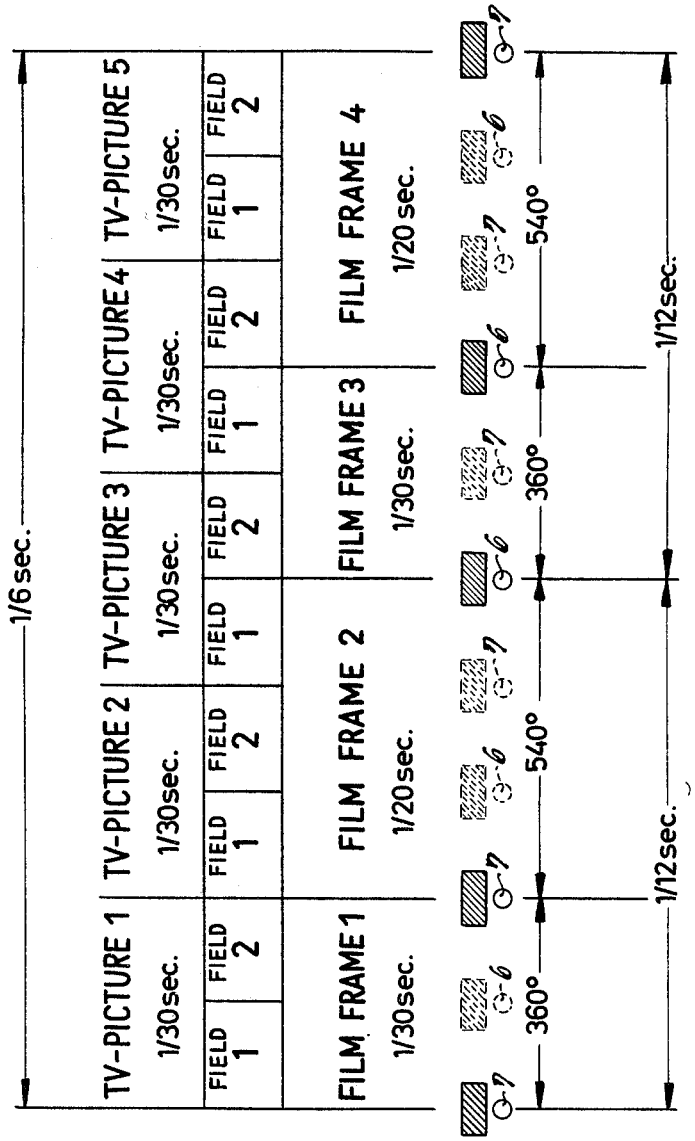

United States Patent Office 3,501,974
Patented Mar. 24, 1970

3,501,974
APPARATUS FOR TRANSPORTING CINEMATOGRAPHIC FILM
Albert Straub, Stuttgart-Bad Cannstatt, Germany, assignor to Robert Bosch Elektronik und Photokino G.m.b.H., Stuttgart, Germany, a corporation of Germany
Filed May 9, 1968, Ser. No. 727,928
Claims priority, application Germany, May 10, 1967,
B 92,448
Int. Cl. F16h 27/06
U.S. Cl. 74—436                                      9 Claims

ABSTRACT OF THE DISCLOSURE

Apparatus for transporting cinematographic film at periodically varying intervals comprises a flywheel (5) which is rotated at 30 revolutions per second (television frame frequency) and carries two axially parallel reciprocable driver pins (6, 7) for a Geneva wheel (8) which is indexible by the pins to drive the film transporting sprocket (14) at 24 frames per second whereby the dwells between successive indexing movements of the wheel alternately equal $\frac{1}{30}$ and $\frac{1}{20}$ of a second. A cam (23) which has a face extending along an arc of 150 degrees is coaxial with the flywheel and receives motion from the drive (4) for the flywheel to rotate at 24 revolutions per second. That driver pin which engages with the face of the cam is operative to index the wheel in response to rotation of the flywheel.

BACKGROUND OF THE INVENTION

The present invention relates to apparatus for transporting cinematographic film. More particularly, the invention relates to improvements in apparatus for transporting film in cinematographic cameras or projectors by resorting to a film-engaging and advancing element which receives motion from a Geneva wheel drive.

Cinematographic film is normally exposed and projected at the frequency of 24 frames per second. Problems arise in television-cinematograph systems wherein the television system has a field frequency of 60 frames or 30 complete television pictures per second. If a conventional cinematographic film is to be used in such systems, the speed at which the film is transported must be adapted to the field frequency of the television system. This is achieved by transmitting the image on the first film frame twice as a part of a television picture, the image on the second film frame three times, the image on the third film frame twice and so forth. Thus, the time required for transmission of images on the first, third, etc. film frame is $\frac{1}{30}$ second and the time required for transmission of images on the second, fourth, etc. film frames is $\frac{1}{20}$ second.

Apparatus for transporting cinematographic film in the just outlined manner are disclosed, for example, in British Patent No. 738,686 and in U.S. Patent No. 3,292,989. The claw pull-down or sprocket which comes into direct engagement with cinematographic film receives motion from a driving member which is rotated by way of a double crank arranged to decelerate the film engaging element during that stage when a first film frame is at a standstill and to accelerate the film engaging element when the next-following film frame is at a standstill. In this way, the film transport takes place at periodically varying intervals. The angular speeds of the driving member for the film engaging element are selected in such a way that a first film frame remains at a standstill for the duration of three and that the next film frame remains at a standstill for the duration of two television frames.

A drawback of such apparatus is that the double crank has a limited life expectancy. This is attributed to the fact that the rotary parts are subjected to fluctuating moments of rotation resulting from periodical acceleration and deceleration of the film engaging element. The resulting vibrations and shocks cause extensive wear on the bearings and produce excessive noise.

My U.S. Patent No. 3,002,423 discloses a cinematographic projector which employs a film engaging claw driven by a cam (shown in FIG. 4) having two identical lobes whose radial axes make an angle of 144 degrees. Since the cam performs 12 revolutions per second, the first film frame remains in projection position for $\frac{1}{30}$ second, the next-following film frame for $\frac{1}{20}$ second, and so forth. This apparatus overcomes the aforediscussed drawback of apparatus which employ double cranks; however, it can be used only in projectors wherein the film is being transported by a claw.

The manufacturers of television-cinematograph systems presently prefer Geneva drives which drive film-engaging sprockets because such drives have a longer useful life and their operation is quieter than that of claw pull-downs. Furthermore, such Geneva drives can transform the film with greater precision and the sprockets are less likely to tear or to otherwise damage the film.

SUMMARY OF THE INVENTION

An object of my invention is to provide an apparatus which can transport film in television-cinematograph systems by way of an improved Geneva wheel drive which is characteriezd by noiseless operation, minimal wear on its parts and greatly reduced likelihood of damage to the film.

Another object of the invention is to provide an apparatus which is particularly suited to advance cinematographic film in a projector or camera forming part of a television-cinematograph system wherein the film must be transported at a frequency which is different from the television picture frequency.

A further object of the invention is to provide a film transporting apparatus which can be built into existing cinematographic cameras or projectors.

The improved apparatus comprises first drive means having a drive shaft which is rotated at a predetermined speed about a fixed axis, namely, at a speed which corresponds to the television picture frequency of a television-cinematograph system, an indexible Geneva wheel which is coupled to a film-engaging member, a pair of driver members mounted on the drive means diametrically opposite each other with reference to the axis of the drive shaft and being movable relative to the drive means in parallelism with such axis between inoperative positions in which they bypass the wheel and operative positions in which they index the wheel while rotating with the drive means, and means for periodically moving the driver members to operative position. This last mentioned means comprises rotary cam means engaging with the driver members and second drive means for rotating the cam means at a second speed which is different from the speed of the first drive means.

The second speed equals the film frame frequency which is normally 24 frames per second. The cam means is preferably coaxial with the drive shaft and has a cam face which extends along an arc of 150 degrees if the film frame frequency is lower by 20 percent than the television picture frequency. The driver members are held in operative positions during engagement with the face of the cam.

The novel features which are considered as characteristic of the invention are set forth in particular in the appended claims. The improved apparatus itself, however, both as to its construction and its mode of operation,

BRIEF DESCRIPTION OF THE DRAWING

FIG. 12 is a graph of a complete cycle of operation of the apparatus shown in FIG. 1.

DESCRIPTION OF THE PREFERRED EMBODIMENTS

Figure 1:
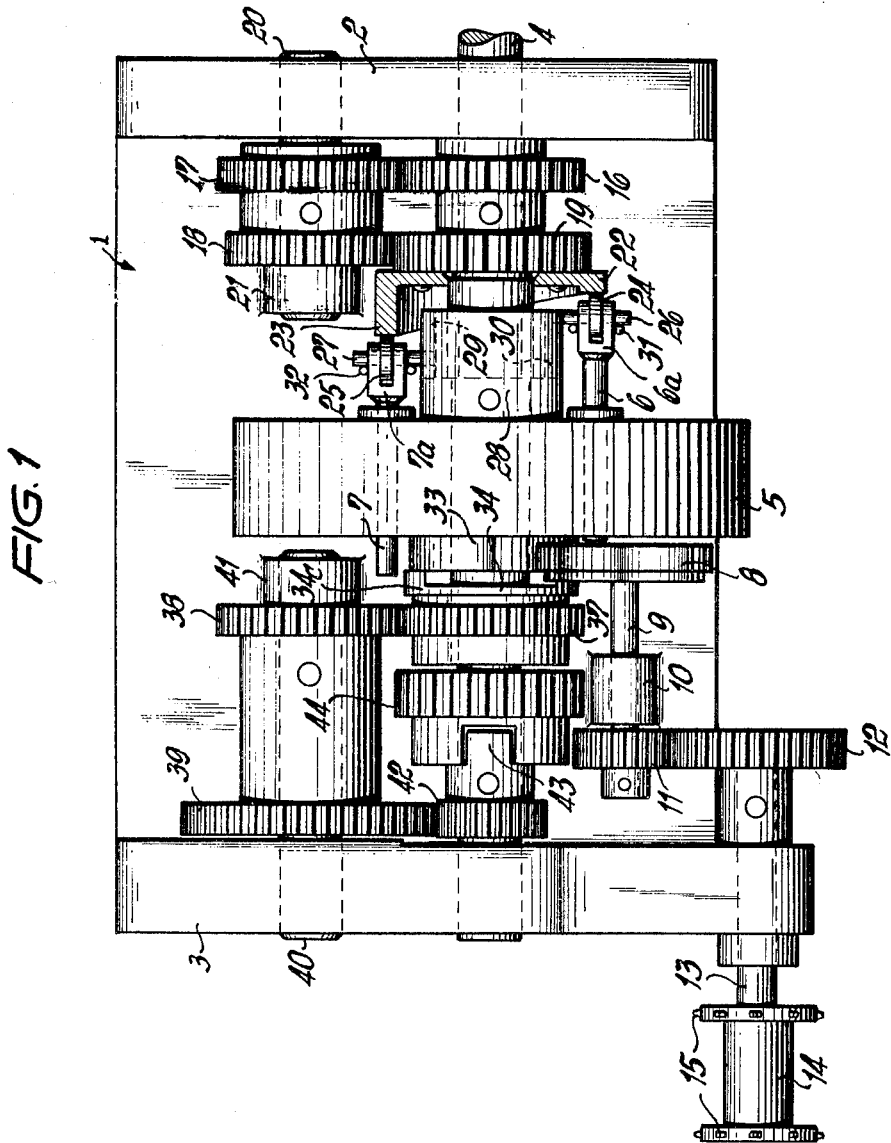
FIG. 1 is a top plan view of an apparatus which embodies the invention.

Referring first to FIG. 1, there is shown a film transporting apparatus comprising a U-shaped frame or support 1 which can be installed in the housing of a cinematographic projector, not shown. The support 1 comprises two spaced parallel flanges or side walls 2, 3 which serve as bearings for portions of a drive shaft 4. The latter is driven by an electric motor (not shown) at 30 revolutions per second and carries a flywheel 5 which is located substantially midway between the flanges 2 and 3. The flywheel 5 has two axially parallel bores which are located diametrically opposite each other and respectively accommodate reciprocable driver pins 6 and 7. These pins serve to periodically index a 4-way Geneva wheel 8 which is fixed to one end of a shaft 9 journalled in a bearing 10 secured to the support 1. The other end of the shaft 9 carries a gear 11 which meshes with a gear 12 mounted on an output shaft 13 for a film-engaging sprocket 14 having two annuli of teeth 15 which enter perforations provided in the respective marginal portions of the film, not shown. The sprocket 14 thus advances the film past a gate (not shown) at the frequency at which the Geneva wheel 8 is indexed by the driver pins 6 and 7. The parts 4, 5 together constitute a drive for the pins 6 and 7.

The drive shaft 4 is rigid with a further gear 16 which meshes with a gear 17 on an intermediate shaft 20 mounted in the flange 2 and in a bearing 21 affixed to the support 1. The shaft 20 carries a second gear 18 in mesh with a gear 19 which is free to rotate on the drive shaft 4. The cluster of gears 17, 18 on the intermediate shaft 20 can be replaced by a different cluster to change the transmission ratio between the gears 16 and 19. In the embodiment which is shown in FIG. 1, the r.p.m. of the drive shaft 4 exceeds the r.p.m. of the gear 19 by 20 percent, i.e., the gear 19 performs 24 revolutions per second. Otherwise stated, the shaft 4 performs five revolutions while the gear 19 performs four revolutions.

The gear 19 carries a disk-shaped motion transmitting member 22 which is provided with a face cam 23. The face of the cam 23 is tracked by roller followers 24, 25 which are mounted on the driver pins 6, 7. It will be noted that the motion transmitting member 22 is installed in the space between the gear 19 and the flywheel 5. The face of the cam 23 extends along an angle of 150 degrees. The function of this cam is to periodically shift the pins 6, 7 in a direction to the left, as viewed in FIG. 1, so that the thus shifted pin 6 or 7 assumes an operative position and can index the Geneva wheel 8. The member 22 effects indexing movements of the wheel 8 at intervals which are necessary for proper synchronization of operation of the cinematographic projector with operation of the television system. This will be fully described in connection with FIGS. 2 to 12. The parts 16–19 and 22 together constitute a drive for the cam 23. This cam rotates in the same direction as the shaft 4.

The roller followers 24, 25 are rotatable on shafts 26, 27 which are mounted in bifurcated end portions 6a, 7a of the driver pins 6, 7. The pins 6, 7 are held against rotation with reference to the flywheel 5 by walls bounding axially parallel grooves 29, 30 machined into a hub 28 which is secured to the drive shaft 4 and/or flywheel 5 and extends toward the cam 23. The grooves 29, 30 respectively receive the radially innermost portions of the shafts 26, 27. These shafts are respectively biased by springs 31, 32 secured to the flywheel 5 which maintain the roller followers 24, 25 in engagement with the face of the cam 23. The followers 24, 25 are mounted on antifriction bearings (not shown) which are installed on shafts 26, 27 in the spaces between the prongs of the end portions 6a, 7a.

The means for blocking unintentional angular displacement of the Geneva wheel 8 when this wheel is not rotated or indexed by one of the pins 6, 7 comprises two blocking disks 33, 34 (see also FIGS. 2 to 11). The blocking disk 33 is rigid with the flywheel 5 and has two concave recesses 35, 36 which are located diametrically opposite each other. The wheel 8 can be indexed by the pin 6 or 7 when such a pin enters that slot of the wheel which is adjacent to the recess 35 or 36.

The other blocking disk 34 is rotatable on the drive shaft 4 and is rigid or integral with a gear 37 which meshes with a gear 38 on an intermediate shaft 40. The latter is rotatable in a bearing 41 on the support 1 and in the flange 3 and carries a second gear 39 meshing with a gear 42 on the drive shaft 4. The gear 42 also drives a claw 43 engaging with a complementary claw provided on a further gear 44 which is rotatable on the drive shaft 4. The gear 44 serves to drive a conventional multiple-blade shutter (not shown) which periodically interrupts the beam of light issuing from the projector lamp (not shown) in a manner well known from the art of such projectors.

The gear train 42, 39, 38, 37 constitutes a drive which rotates the blocking disk 34 at a ratio of 2:5, i.e., the disk 34 rotates at 12 revolutions per second. This disk 34 has three angularly spaced blocking projections or lugs 34a, 34b, 34c which are of identical size. Each of these lugs can hold the wheel 8 against rotation when the driver pin 6 or 7 is retracted to inoperative position so that it bypasses the wheel without entering one of the four slots therein.

Figure 2:
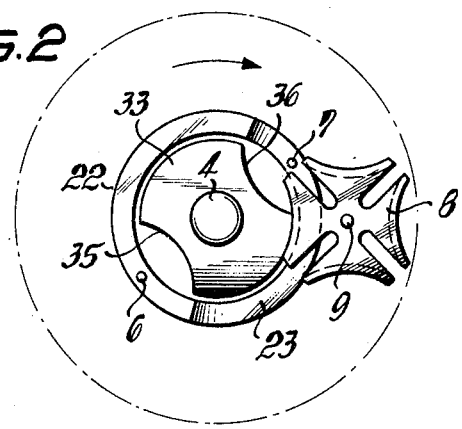
FIGS. 2 and 3 illustrate a first stage in the operation of the apparatus of FIG. 1.
Figure 3:
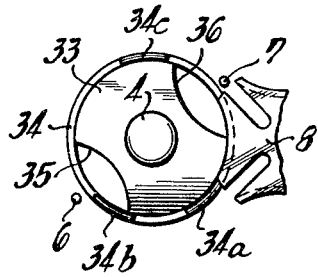

The operation of the apparatus shown in FIG. 1 is as follows:

FIG. 2 illustrates the motion transmitting member 22 and its cam 23 in an angular position in which the arcuate face of the cam 23 maintains the driver pin 7 in extended or operative position, i.e., the spring 32 stores energy and the pin 7 assumes the axial position shown in FIG. 1. The shaft 4 drives the flywheel 5 and the pins 6, 7 in a clockwise direction, as viewed in FIG. 2. The pin 7 is about to enter the adjoining radial slot of the Geneva wheel 8 and is adjacent to the recess 36, i.e., the disk 33 does not prevent indexing of the wheel 8. When the wheel changes its angular position, it rotates the shaft 9, gears 11, 12, output shaft 13 and sprocket 14 so that the latter transports the film by an increment corresponding to the length of a frame. The second blocking disk 34 then assumes the angular position of FIG. 3 in which the lugs 34a–34c cannot interfere with indexing of the wheel 8.

In the meantime, the other driver pin 6 tracks a portion of the cam 23 which allows it to assume the inoperative position shown in FIG. 1, i.e., the left-hand end of the pin 6 can bypass the wheel 8 without entering one of the slots therein when the flywheel 5 turns through 180 degrees beyond the position shown in FIG. 2. During such angular displacement of the flywheel 5 by 180 degrees, the second blocking disk 34 turns through an angle of 72 degrees so that it moves the lug 34c into blocking position to prevent unintentional angular displacement of the wheel 8. Such unintentional angular displacement of the wheel 8 could take place while the wheel is being bypassed by the retracted pin 6, i.e., while the recess 35 of the first blocking disk 33 is adjacent to the wheel.

Figure 4:
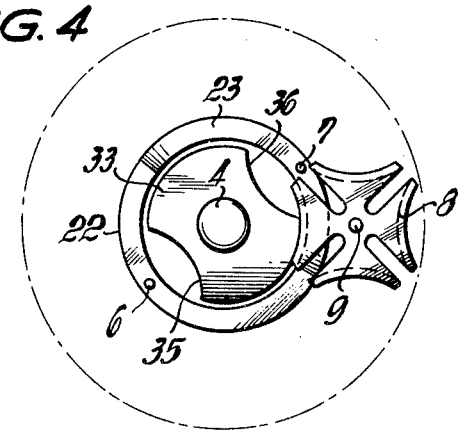
FIGS. 4–5, 6–7, 8–9 and 10–11 respectively illustrate four additional stages.
Figure 5:
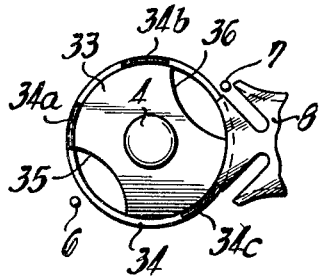

FIGS. 4 and 5 illustrate a further stage in the rotation of the drive shaft 4 and cam 23. The drive shaft 4, flywheel 5 and blocking disk 33 have completed a full revolution (compare FIGS. 2 and 4). During such full revolution of the shaft 4 (which took 1/30 of a second), the cam 23 has been rotated through 360 minus 72=288 degrees. The face of the cam 23 continues to hold the pin 7 in extended position so that the pin 7 again indexes the wheel 8 and turns it by 90 degrees. The interval which elapsed between two successive indexing movements of the wheel 8 lasted 1/30 of a second. In other words, the film was at a standstill for 1/30 of a second.

The blocking disk 33 turns with the shaft 4 and assumes the angular position shown in FIG. 5 when the pin 7 enters a slot of the wheel 8 for the second time in a row (FIGS. 2 and 4). The recess 36 is then in an angular position (FIG. 5) in which it allows the pin 7 to index the wheel 8 by 90 degrees. While the shaft 4 completes a full revolution, the second blocking disk 34 turns through an angle of 144 degrees because the ratio of the angular speeds of shaft 4 and disk 34 is 5:2. Thus, when the pin 7 enters a slot of the wheel 8 for the second time in a row, the second blocking disk 34 assumes the angular position of FIG. 5 and its lugs 34a–34c cannot interfere with indexing of the wheel.

Figure 6:
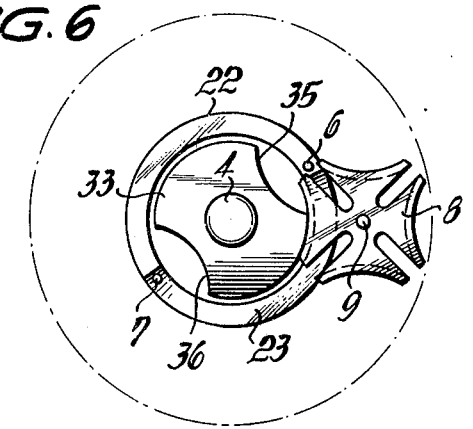
Figure 7:
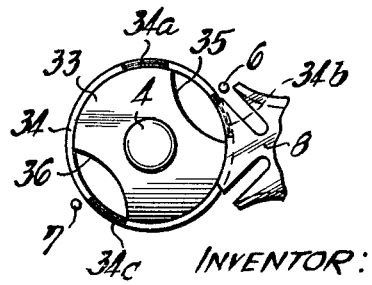

FIGS. 6 and 7 illustrate a further stage after the drive shaft 4 completes one-half of a revolution (compare FIGS. 4 and 6). The pin 6 is about to bypass the wheel 8 and the pin 7 is about to leave the face of the cam 23, i.e., the pin 6 is still in retracted position and the spring 32 is about to move the pin 7 to retracted position. In other words, the angular position of the wheel 8 remains unchanged. As shown in FIG. 7, the lug 34b of the second blocking disk 34 holds the wheel 8 against unintentional angular displacement, namely, against unintentional angular displacement while the wheel is being bypassed by the pin 6 and while the recess 35 of the first blocking disk 33 does not prevent angular displacement of the wheel.

When the drive shaft 4 turns through another 180 degrees (FIGS. 8 and 9), the pin 7 (in retracted or inoperative position) approaches and bypasses the wheel 8 but the pin 6 is still held in extended position. While the recess 36 of the first blocking disk 33 travels past the wheel 8, the latter is held against unintentional angular displacement by the lug 34a of the second blocking disk 34 (FIG. 9).

Figure 8:
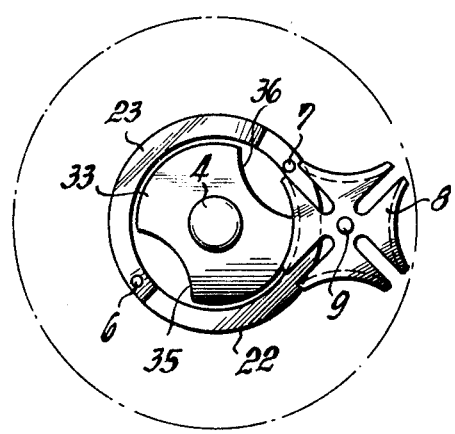
Figure 9:
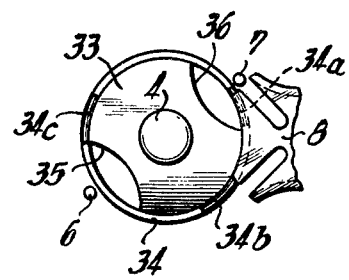
Figure 10:
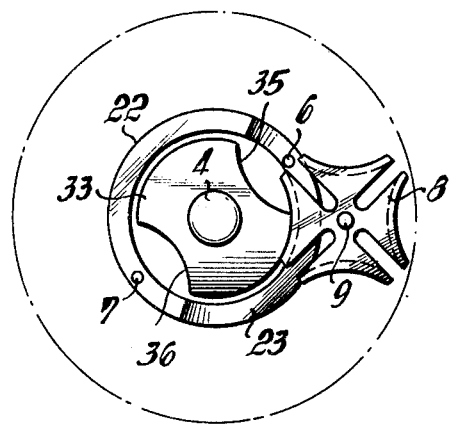
Figure 11:
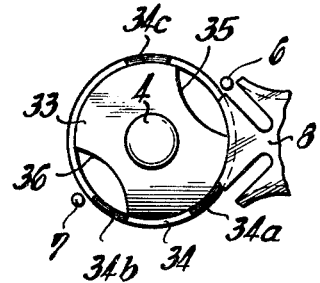

FIGS. 10 and 11 illustrate a further stage after the drive shaft 4 completes one-half revolution (compare FIGS. 8 and 10). The pin is held in extended or operative position by the cam 23, and the pin 7 is held in retracted or inoperative position by the spring 32. The recess 35 and the lugs 34a–34c allow the pin 6 to turn the wheel 8 by 90 degrees.

An examination of FIGS. 4–11 will reveal that the shaft 4 turns through 540 degrees before the pin 6 indexes the wheel 8. Such angular displacement of the shaft 4 through 1½ revolutions requires 1/20 of a second. Thus a film frame which is moved into registry with the optical system of the projector dwells in such registry for a period of time which is longer by one-third than the period of registry between the optical system and the film frame which has been advanced into such registry by the pin 7.

In FIG. 10, the angular position of the cam 23 on the motion transmitting member 22 is the same as that in FIG. 2. Thus, the aforedescribed cycle is then repeated with the sole exception that the pin 6 indexes the wheel two times in a row and that the pin 7 indexes the wheel again after the drive shaft 4 completes 1½ revolutions.

The graph of FIG. 12 shows that the Geneva wheel 8 insures the generation of 30 television pictures (U.S. standard) by resorting to a film which is advanced at 24 frames per second. The upper part of the graph indicates a succession of five television pictures each of which has a duration of 1/30 of a second. Thus, the taking of these five pictures requires 1/6 of a second.

The second row of the graph indicates the fields 1 and 2 which respectively contain lines with odd and even numbers.

The third row of the graph indicates the sequence of film frames which produce the fields. It is shown that the second and fourth film frames dwell in the gate longer (by 50 percent) than the first and third film frames.

The boxes in the fourth row of the graph shown in FIG. 12 indicate the indexing movements of the Geneva wheel 8 by solid-line hatching. As shown, the wheel 8 is indexed twice in a row by the pin 7, then twice in a row by the pin 6, again twice in a row by the pin 7 and so forth, i.e., in a sequence as described in connection with FIGS. 2 to 11. Thus, the drive shaft 4 completes a full revolution during the interval between the first two indexing movements of the wheel 8 (under the action of the pin 7), thereupon 1½ revolutions between the second and third indexing movements (first under the action of the pin 7 and then under the action of the pin 6), again a full revolution between the third and fourth indexing movements (both under the action of the pin 6), and so on. In other words, and speaking in terms of time, the first film frame corresponds to two fields, the second frame to three fields, he third frame to two fields, and the fourth frame to five fields.

The broken-line circles indicate those pins which are in inoperative positions during travel past the wheel 8. The corresponding positions of the wheel 8 are indicated by broken-line hatching.

An important advantage of the improved apparatus is that its rotary or otherwise movable parts need not undergo periodical acceleration or deceleration. Thus, the rotational speed of the three drives 4, 5; 16–19, 22; 37–39, 42 is constant at all times. Therefore, the life expectancy of the apparatus matches that of conventional apparatus wherein the film is transported at unchanging frequency.

Without further analysis, the foregoing will so fully reveal the gist of the present invention that others can, by applying current knowledge, readily adapt it for various applications without ommitting features which fairly constitute essential characteristics of the generic and specific aspects of my contribution to the art.

What is claimed as new and desired to be protected by Letters Patent as set forth in the appended claims:

1. Apparatus for transporting film, particularly for transporting cinematographic film in a television-cinematograph system wherein the film is transported intermittently at periodically varying intervals, comprising first drive means arranged to rotate about a fixed axis at a predetermined speed; an indexible film-advancing Geneva wheel arranged to rotate about a fixed axis; a pair of driver members mounted on said drive means diametrically opposite each other with reference to said axis, said driver members being movable independently of each other relative to said drive means between inoperative positions in which they engage and index said wheel while rotating with said drive means; and means for periodically moving said driver members to operative positions, comprising rotary cam means engaging with said driver members and second drive means for rotating said cam means at a speed which is different from said predetermined speed.

2. Apparatus as defined in claim 1, wherein said first drive means is arranged to rotate at 30 revolutions per second and said second drive means is arranged to rotate said cam means at 24 revolutions per second, said driver members being movable in parallelism with said axis and said cam means being coaxial with said first drive means and being driven by said second drive means in the same direction in which said driver members are rotated by said first drive means, said cam means having an arcuate cam face extending along an arc of 150 degrees and said driver members being held in opeartive positions while engaging with said cam face.

3. Apparatus as defined in claim 1, wherein said second drive means further comprises a disk-shaped motion transmitting member rotatable with reference to said first drive means about said axis and coaxially secured to said cam means.

4. Apparatus as defined in claim 1, further comprising blocking means arranged between said first drive means and said indexible film-advancing Geneva wheel for holding said wheel against indexing movement while said driver members are remote from said wheel and while a driver member bypasses said wheel in the inoperative position thereof.

5. Apparatus as defined in claim 4, wherein said blocking means comprises a first blocking member fixed for rotation to said first drive means, a second blocking member, and third drive means for rotating said second blocking member at a speed which is different from the speed of said first drive means.

6. Apparatus as defined in claim 5, wherein said first and second blocking members respectively comprise coaxial first and second disks and wherein said third drive means is arranged to drive said second disk at twelve revolutions per second.

7. Apparatus as defined in claim 6, wherein said second and third drive means receive motion from said first drive means.

8. Apparatus as defined in claim 1, wherein each of said driver members is a pin and wherein each of said pins comprises a follower at one end and resilient means for biasing the follower against said cam means.

9. Apparatus as defined in claim 8, further comprising antifriction bearing means interposed between each of said followers and the respective pin.

References Cited

UNITED STATES PATENTS

| | | | |
|---|---|---|---|
| 2,589,940 | 3/1952 | Hayek | 74—436 |
| 2,757,569 | 8/1956 | Isom | 74—112 |
| 3,386,636 | 6/1968 | Badalich | 74—436 |

FRED C. MATTERN, Jr., Primary Examiner

W. S. RATLIFF, Jr., Assistant Examiner